United States Patent [19]

Huang

[11] Patent Number: 5,677,580
[45] Date of Patent: Oct. 14, 1997

[54] TRANSVERSAL-FLUX PERMANENT MAGNET MOTOR

[75] Inventor: Hao Huang, Montevideo, Minn.

[73] Assignee: SL Montevideo Technology, Inc., Montevideo, Minn.

[21] Appl. No.: 148,516

[22] Filed: Nov. 8, 1993

[51] Int. Cl.⁶ .................. H02K 15/12; H02K 21/00; H02K 1/12; H02K 1/22
[52] U.S. Cl. .................. 310/44; 310/194; 310/254; 310/266
[58] Field of Search .............. 310/156, 44, 42, 310/43, 49 R, 49 A, 68 B, 187, 192, 193, 216, 267, 254, 164, 112, 194, 266

[56] References Cited

U.S. PATENT DOCUMENTS

| | | | |
|---|---|---|---|
| 4,181,866 | 1/1980 | Morisawa | 310/154 |
| 4,217,508 | 8/1980 | Uzuka | 310/46 |
| 4,296,341 | 10/1981 | Güttinger | 310/41 |
| 4,315,363 | 2/1982 | Barone | 29/596 |
| 4,355,249 | 10/1982 | Kenwell | 310/49 R |
| 4,480,208 | 10/1984 | Logie et al. | 310/194 |
| 4,553,075 | 11/1985 | Brown et al. | 318/254 |
| 4,575,652 | 3/1986 | Gogue | 310/49 R |
| 4,600,910 | 7/1986 | Vanderlaan | 335/229 |
| 4,612,526 | 9/1986 | Vanderlaan et al. | 335/229 |
| 4,947,065 | 8/1990 | Ward et al. | 310/44 |
| 4,973,866 | 11/1990 | Wang | 310/49 R |
| 4,987,331 | 1/1991 | Horng | 310/254 |
| 5,015,903 | 5/1991 | Hancock et al. | 310/168 |
| 5,220,228 | 6/1993 | Sibata | 310/254 |
| 5,382,859 | 1/1995 | Huang et al. | 310/216 |

OTHER PUBLICATIONS

Weh et al, "New Permanent Magnet Excited Synchronous Machine with High Efficiency at Low Speeds", ICEM 88, pp. 35–40.

*Primary Examiner*—Steven L. Stephan
*Assistant Examiner*—Michael J. Wallace, Jr.
*Attorney, Agent, or Firm*—Nixon & Vanderhye P.C.

[57] ABSTRACT

A brushless transversal-flux permanent magnet motor has a stator construction that forms a virtual bobbin, so that windings may be simply circumferentially wrapped around the stator, eliminating the need for winding insertion. The stator may be constructed of first and second core structures each having an elongated powdered iron pole piece central portion with end terminations, and integral with a tubular element also of powdered iron. Epoxy, or like non-magnetic material, fills in the volume between the pole piece end terminations to form a disc-shaped structure, the windings wrapping around the tubular elements. A discontinuity is provided on each pole piece and termination to allow start-up. The rotor may be a yoke having permanent magnet rings aligned with the pole pieces, and mounted for rotation by a shaft central of the tubular elements engaging bearings in the tubular elements. A circuit board containing motor control circuitry (for switching connection of the windings to a source of electrical power) can be connected to the stator to mechanically mount it while facilitating connection of the windings to the circuitry.

22 Claims, 3 Drawing Sheets

TRANSVERSAL-FLUX PERMANENT MAGNET MOTOR

BACKGROUND AND SUMMARY OF THE INVENTION

The transversal-flux permanent magnet motor was originally conceived as a way of providing high power densities combined with high efficiencies, including a direct drive instead of reduction gearing in order to reduce weight, cost, energy losses, and maintenance. The transversal-flux permanent magnet motor was first described by Dr. H. Weh in a paper published in 1988 entitled "New Permanent Magnet Excited Synchronous Machine With High Efficiency at Low Speeds". While the basic concept and results achievable from such a motor are accepted and sought after, respectively, became of its complicated structure and high manufacturing cost, the transversal-flux permanent magnet motor has not been adopted by the motor industry to date for substantial commercialization. According to the present invention, these problems with the original concept of transversal-flux permanent magnet motors have been overcome. According to the invention, a transversal-flux permanent magnet motor is provided which is simple and low cost.

The motor according to the present invention is simple and low cost because it has a number of unique structural features. The stators are powdered iron, which may be doubly coated (with phosphate and thermoplastic), and have simple circumferential wrappings as the windings instead of conventional windings, so that the cost of winding insertion is completely eliminated. Also, the stator has an internal passageway for receiving a shaft of the rotor, and for mounting the rotor in a simple, low-volume, and easily maintainable configuration. The permanent magnets are typically in the form of rings which are aligned with pole pieces of the stator, one ring having internal south poles, and the other ring internal north poles. A circuit board, containing electronic circuitry for switching the windings so that they are alternately connected to a source of power, mounts the stator. The circuit board connected to the stator at an end thereof opposite the end receiving the shaft from the rotor. The motor may be constructed as a four pole motor, eight pole motor, or any other conventional arrangement for brushless motors.

According to one aspect of the present invention, a brushless transversal-flux permanent magnet motor is provided comprising first and second stator core structures of magnetizable material, each having a pole piece and a tubular element, the tubular element extending substantially transversely to the pole piece. First and second windings received by the stator core structures. A shaft received by the tubular elements of the stator core structures, the tubular elements being aligned with each other. A rotor yoke connected to the shaft and surrounding the stator core structures, and including first and second permanent magnets. And, means for holding the stator core structure together so that the pole pieces extend in planes substantially parallel to each other, oriented in the planes so that the pole pieces are perpendicular to each other.

The stator core structure preferably is of powdered iron, which may be coated with phosphate and thermoplastic. The pole pieces typically comprise an elongated central section having enlarged end terminations, perpendicular to a tubular element connected at the middle of the central section. The enlarged terminations each have a discontinuity to allow easy motor start-up. For example, the surfaces of the terminations most remote from the tubular elements may be primarily arcuate, having a flat surface as the discontinuity. The volume between the enlarged ends and the central section preferably is filled with non-magnetic material such as epoxy, so that the pole pieces have a disc configuration extending perpendicular to the tubular element.

The motor also preferably comprises means for switching the windings so that they are alternately connected to a source of power. The electronic switching means is mounted on a board, and the holding means includes the board. The electronic switching means may comprise first and second transistors each having an associated RC circuit, and a motor starting circuit connected up to the transistors and RC circuits. The holding means may also include bearing means inside the tubular elements, the pole pieces having central openings aligned with tubular elements for receipt of the shaft.

According to another aspect of the present invention, a stator is provided for a brushless transversal-flux permanent magnet motor. The stator comprises first and second pole pieces each comprising an elongated central portion having enlarged end terminations, of magnetic material. A cylindrical element extends between the pole pieces connected to the center of each. The pole pieces extend in parallel planes generally radially from the cylindrical element, and angularly offset about 90°. First and second windings, in the form of simple circumferential wrappings, are provided around the cylindrical element and between the pole pieces.

The cylindrical element is preferably tubular having a through-extending central passageway, and at least the second pole piece has a central through-extending opening aligned with the passageway (for receipt of a rotor shaft). The cylindrical element may be segmented, having first and second portions each integral with one of the first and second pole pieces. The construction of the pole pieces is preferably as described above.

According to yet another aspect of the invention, a brushless transversal permanent magnet motor is provided having a stator as described above. In addition, it also comprises a rotor having first and second permanent magnetic rings aligned with the stator first and second pole pieces, respectively, surrounding the stator and mounted for rotation with respect thereto; and electronic switching means for switching the windings so that they are ultimately connected to a source of power. The motor may be a four pole motor, or an eight pole motor, or have any conventional number of poles.

According to still another aspect of the present invention, a brushless motor is provided comprising the following elements. A circuit board having motor drive circuitry thereon. A stator mounted to the circuit board, in the form of a virtual bobbin. First and second windings in the form of circumferential wrappings around the virtual bobbin, the windings being electrically connected to the motor drive circuitry. A rotor having magnetic rings; and means for mounting the rotor for rotation with respect to the stator. Typically, the stator has a through-extending central passage and the means for mounting the rotor includes a shaft extending into the passage and engaging bearing means acting between the stator and the shaft.

It is the primary object of the present invention to provide a simple, lost cost, yet effective transversal-flux permanent magnet motor, and components thereof. This and other objects of the invention will become clear from an inspection of the detailed description of the invention, and from the appended claims.

DETAILED DESCRIPTION OF THE DRAWINGS

Figure 1:
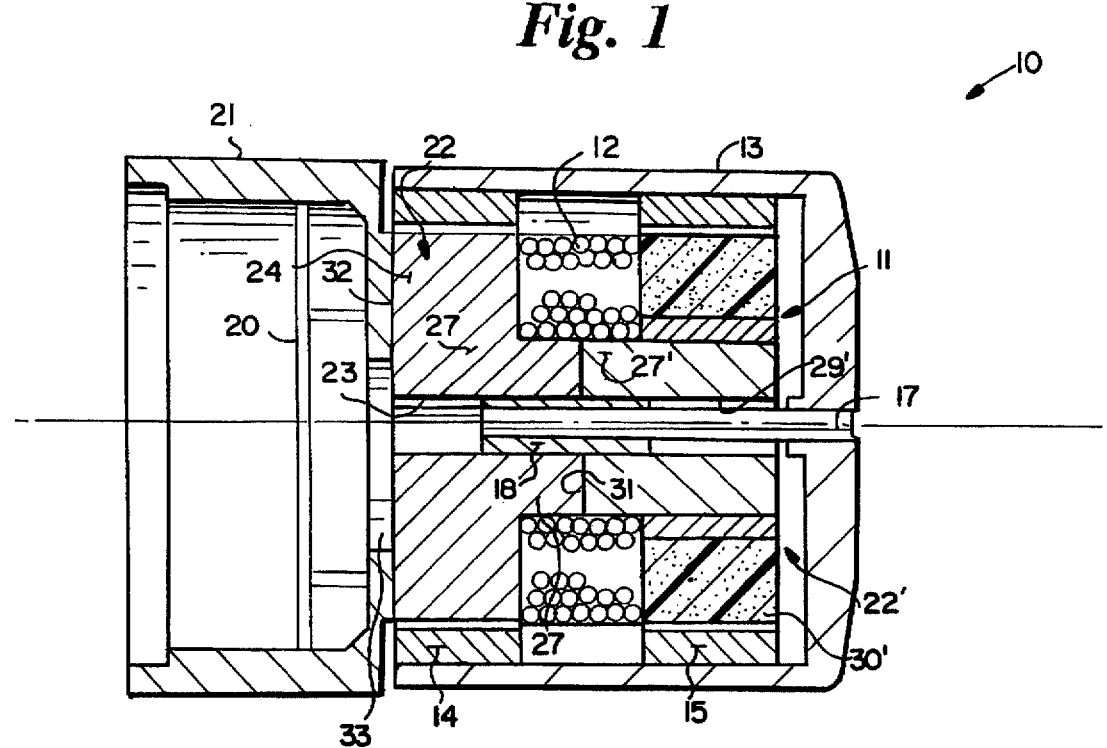
FIG. 1 is a longitudinal cross-sectional view, partly in elevation, of a first embodiment of a transversal-flux permanent magnet motor according to the present invention.

An exemplary transversal-flux permanent magnet motor according to the present invention is shown generally by reference numeral 10 in FIG. 1. The motor includes a stator 12 having first and second windings (shown collectively at 12) associated therewith, and a rotor 13. The rotor 13 has permanent magnets mounted on the interior surface thereof, indicated by reference numerals 14 and 15 in FIGS. 1, 3 and 4, one set of magnets (14) having interior surfaces thereof as magnet south poles, while the other set (15) has the interior surface thereof as north poles. The rotor 13, which may comprise a tube open at one end and closed at the other, is mounted for rotation by a shaft 17, received by a bearing means 18 interior of the stator 11.

Mounted at the opposite end of the stator 11 from the shaft 17 is a circuit board 20, which may be disposed within a housing 21. The housing 21 may be connected to the stator as will be hereinafter described. The stator 11 preferably comprises two structures, first and second stator core structures 22, 22', which may be substantially (i.e. exactly or almost) identical. The stator first core structure 22 is seen more clearly in FIG. 2.

The stator structure 22 comprises a central portion 24 of magnetizable material, which may have a central through-extending opening 23 (see FIG. 1) therein. The ends of the central section 24 are enlarged end terminations 25, 26 respectively. Connected to or integral with the central section 24' is the tubular element 27, also of magnetizable material having an interior through-extending passage 29 which is aligned with the opening 23.

The magnetizable material forming the components 24, 25, 26 and 27 preferably comprises powdered iron. The powdered iron may be doubly coated, for example with phosphate and thermoplastic coatings. The volume between the end terminations 25, 26 and the central section 26 is preferably filled with a non-magnetizable material, such as the epoxy 30. This results in a construction of an element 22 which comprises a disc, with the tubular element 27 extending outwardly from the center thereof.

The end terminations 25, 26 preferably have primarily arcuate surfaces 28 which are the most remote (radially) portions of the pole pieces from central opening 23 and tubular element 27. However, in order to allow easy start-up of the motor 10, the surfaces 28 must have discontinuities therein. Discontinuities preferably are provided by the flat surfaces 31 seen in FIG. 2.

The construction of the second stator core structure 22' is substantially the same as the construction of the first structure 22.

The housing 21 for the circuit board 20 may be connected to the stator core structure 22 by adhesive, as indicated at 32 in FIG. 1, and/or by one or more holding pins 33 (preferably two pins 33 are provided, only one of which is seen in FIG. 1). Each pin 33 may have a polygon construction or the like, or may comprise a key fitting within a keyway in the central passage 23.

Figure 2:
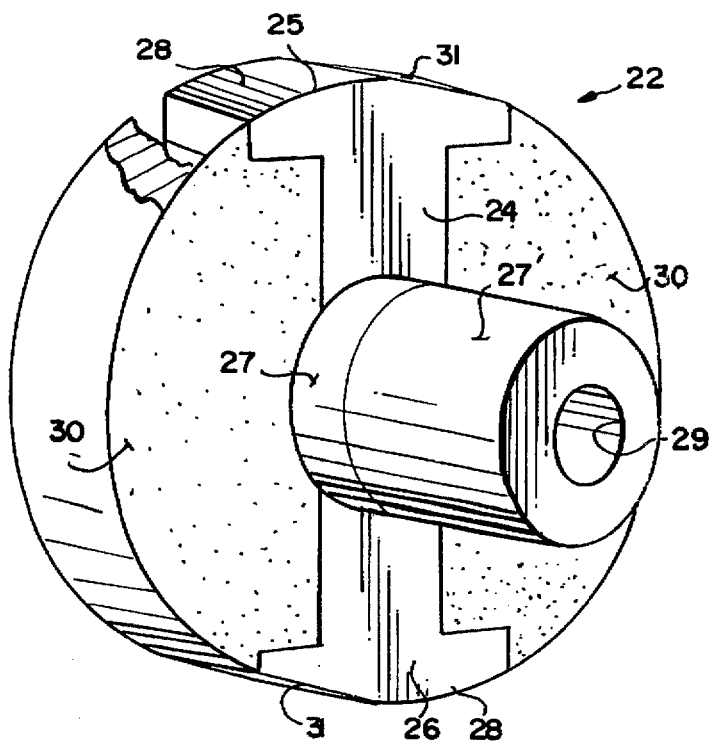
FIG. 2 is a perspective view of half of the stator of the motor of FIG. 1.
Figure 3:
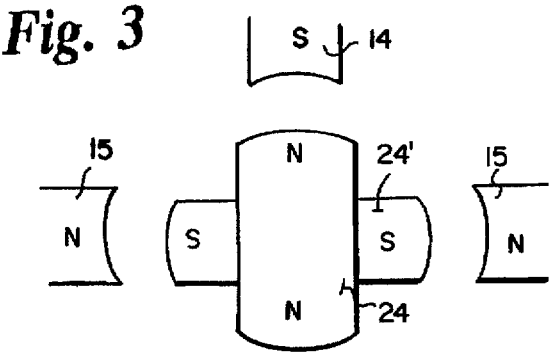
FIG. 3 is an end schematic view of the motor of FIG. 1 showing alignment between a stator and rotor magnetic components thereof.

In FIGS. 1 through 3 a four pole motor is illustrated for ease of explanation. However, the motor 10 may have as many poles as any conventional brushless motor constructions. During operation the flux from the north poles of the rotor (that is, the magnets 15) travel into the poles enlarged end terminations 25, 26 of the stator structure (22') aligned with the magnets 15, through the other stator structure (22) to the south poles 14 on the rotor 13, and back to the north poles with the rotor turn path. Note that the central structures 24, 24' of the pole pieces 22, 22' are in planes that are parallel to each other (perpendicular to the openings 29, 29'), however, the central sections 24, 24' themselves are perpendicular to each other, as illustrated schematically in FIG. 3. Thus, when one of the stator windings 12-1 or 12-2 (see FIG. 5) is supplied with current, a leading magnetic field is created on the stator, which pulls the rotor field and a traction torque is then produced. Once the magnetic field is aligned with the stator magnetic field as illustrated schematically in FIG. 3, the electronic circuit board 20 circuitry commutes one winding (e.g., 12-1) to the other (12-2). Commutation takes place periodically when the fields are aligned, as illustrated in FIG. 3.

Figure 4:
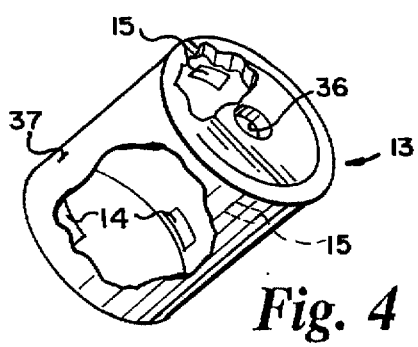
FIG. 4 is a perspective view, with portions of the casing cut away for clarity of illustration, of the rotor of the motor of FIG. 1.

FIG. 4 illustrates an exemplary rotor structure 13, comprising an end wall 35 having an opening 36 therein for the shaft 17, and a tubular body 37. On the interior of the body 37 the permanent magnets 14, 15 are mounted. The magnets 14, 15 may be discrete elements, as illustrated in the schematic representation in FIG. 3. However, preferably they are rings so that they are easier to assemble, as will be described hereafter.

Figure 5:
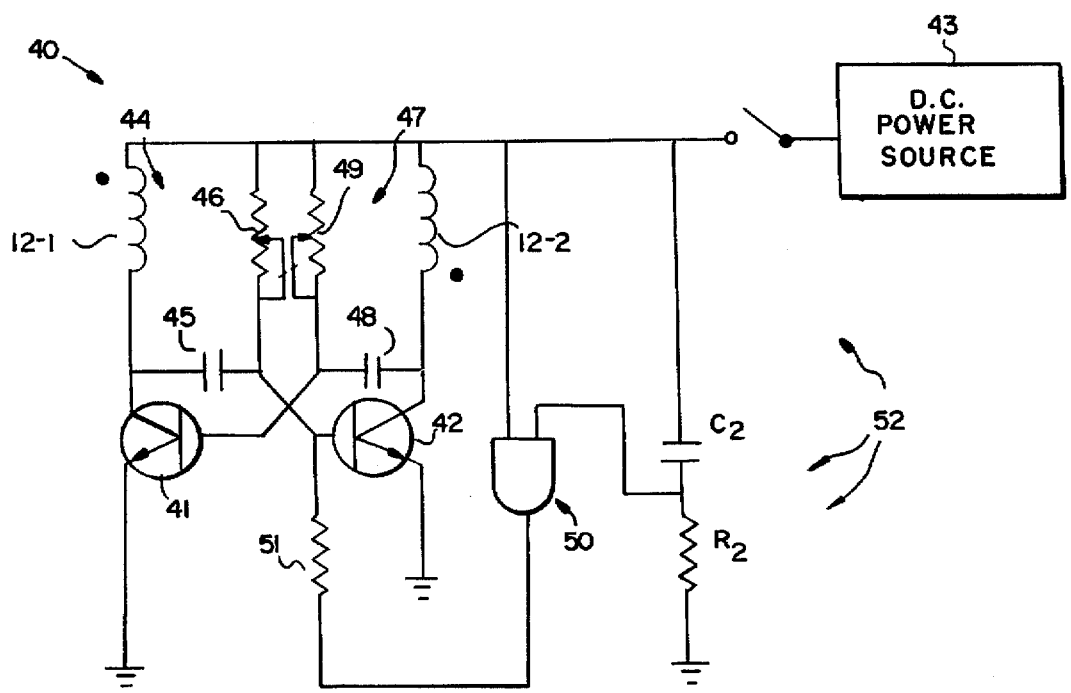
FIG. 5 is a circuitry schematic illustrating exemplary circuitry that can be utilized with the motor of FIG. 1.

Exemplary circuitry mounted on the circuit board 20 for effecting commutation is illustrated generally by reference numeral 40 in FIG. 5. The circuitry 40 comprises first and second transistors 41, 42 connected to the stator windings 12-1, 12-2, respectively, at one end thereof, the other end of each winding 12 being connected to a D.C. power source 43 (e.g. a 12 volt emf source). The opposite ends of the transistors 41, 42 are connected to ground. The circuit 44, having capacitor 45 and resistor 46, is connected between the stator winding 12-1 and the second transistor 42, while another circuit 47 includes the capacitor 48 and resistor 49 connected between the stator winding 12-2 or the first transistor 41. The collector—coupled pair operates as a multivibrator with a frequency of $$\frac{0.7}{R \cdot C}.$$

R is the value of resistor 46 or 49 and C is the value of capacitor 45 or 48. Resistors 46, 49 are also for adjusting the speed of the motor 10. An AND gate may be connected up to the second transistor 42, through a resistor 51, as illustrated in FIG. 5. The AND gate 50 ensures alignment of the rotor 13 and stator 12, so that the rotor 13 will rotate in one direction only. The AND gate 50 is connected to the power source 43 and ground through circuit elements 52.

Figure 6:
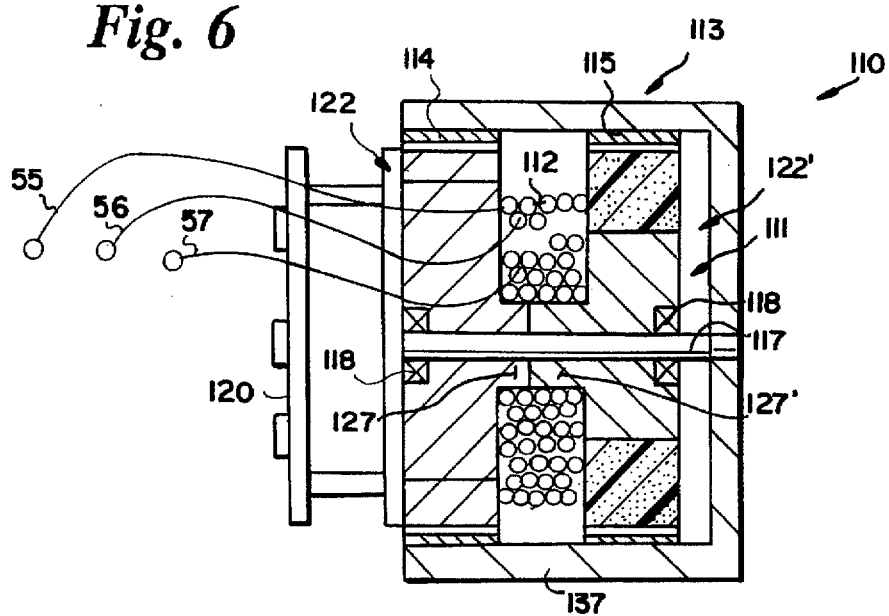
FIG. 6 is a view like that of FIG. 1 for a second exemplary embodiment of motor according to the invention.
Figure 7:
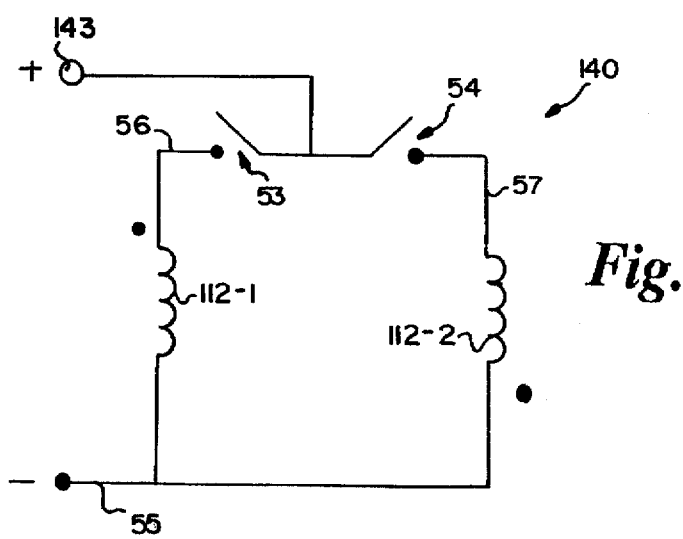
FIG. 7 is a schematic of circuitry that may be utilized with the motor of FIG. 6.

FIG. 6 illustrates a second exemplary embodiment of a motor 110 according to the present invention. The FIG. 6 embodiment (various features thereof are shown in FIGS. 7 and 8) structures comparable to those in the FIGS. 1 through 5 embodiment are shown by the same reference numerals only preceded by "1".

One primary difference between the embodiments of FIGS. 1 and 6 is the particular manner in which the shaft 17, 117 for the rotor 13, 113 is mounted. In the FIG. 6 embodiment, there are two sets of bearings 118, at opposite ends of the stator, 111. Also, in the FIGS. 6 through 8 embodiment, the circuitry means 140 is different, stator windings 112-1, 112-2 being connected up to the switches 53, 54. FIG. 6 shows three leads 55 through 57 from the windings 112, and FIG. 7 shows those same leads 55–57. The switches 53, 54 may be operated by any suitable automatic means for commutation of the windings 112-1, 112-2.

Figure 8:
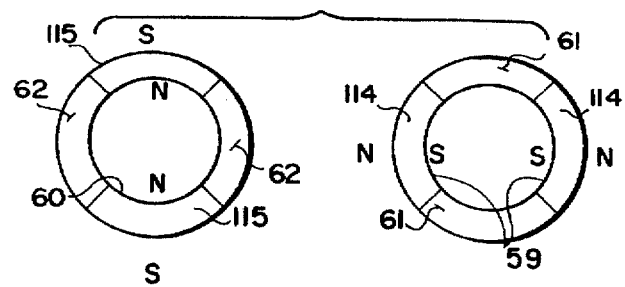
FIG. 8 is an end detail view of the rings of the rotor for the motor of FIG. 6.

FIG. 8 also shows the magnetic rings 115, 114 as complete rings. The rings 114, 115 are of magnetizable material, and they are magnetized so that the ring 114 south pole is the interior surface 59, while on the ring 115 the north pole is the interior surface 60. Note that the rings 114, 115 are magnetized so that magnetic sections are separated by non-magnetized sections 61, 62, this being the construction for a four pole motor, but other constructions may be provided for different numbers of poles. By using rings 114, 115 instead of discrete magnets, it is much easier to attach (e.g., with adhesive) the magnets to the interior surface of the cylindrical wall 137 of the rotor 113.

In the FIGS. 1 and 6 embodiments, the stators 11, 111 each have a configuration of a virtual bobbin. That means that the windings 12, 112 may be provided between the discs of the stator structures 22, 22' and 122, 122' as simple circumferential wrappings so that the cost of winding insertion is completely eliminated. In the FIG. 1 embodiment, the bearing 18 also acts to mechanically hold the stator core structures 22, 22' together, while in the FIG. 6 embodiment, the tubular elements 127, 127' are either connected together by adhesive, or the bearings 118 are thrust bearings so that a force is supplied pushing the stator core structures 122, 122' together.

It will thus be seen that according to the present invention, a simple, compact, low-cost yet effective brushless transversal-flux permanent magnet motor has been provided, as well as a unique stator construction for a brushless motor having a virtual bobbin configuration allowing simple circumferential windings. While the invention has been herein shown and described in what is presently conceived to be the most practical and preferred embodiment, it will be apparent to those of ordinary skill in the art that many modifications may be made within the scope of the invention, which scope is to be accorded the broadest interpretation of the appended claims so as to encompass all equivalent structures and devices.

What is claimed is:

1. A brushless transversal-flux permanent magnet motor comprising:

distinct first and second stator core structures of magnetizable material, each having a distinct pole piece and a tubular element, each said tubular element extending substantially transversely to a said pole piece and integral therewith;

first and second windings received by said stator core structure and at least one of said windings in contact with at least one of said tubular elements;

a shaft defining an axis and received by said tubular elements of said stator core structures, said tubular elements being aligned with each other and spacing said first and second stator core structures along said axis, a rotor yoke connected to said shaft and surrounding said stator core structures, and including first and second permanent magnets aligned with said stator first and second pole pieces; and said stator core structure being held together so that said pole pieces extend in planes substantially parallel to each other, oriented in said planes so that the pole pieces are perpendicular to each other.

2. A motor as recited in claim 1, wherein said stator core structures are of powdered iron.

3. A motor as recited in claim 1 wherein said pole pieces comprise an elongated central section perpendicular to said tubular element with enlarged terminations, each termination including a discontinuity to allow motor start-up; and further comprising non-magnetic material filling in the volume between said central section and said end terminations to provide a disc.

4. A motor as recited in claim 3 wherein said non-magnetic material is epoxy.

5. A motor as recited in claim 1 further comprising electric switching means for switching said windings so that they are alternately connected to a source of power.

6. A motor as recited in claim 1 wherein said stator core structures when held together have the shape of a virtual bobbin; and wherein said windings are simple circumferential wrappings around said virtual bobbin.

7. A motor as recited in claim 5 wherein said electrical switching means are mounted on a board; and wherein said stator core structure is held together by said board.

8. A motor as recited in claim 1 further comprising bearing means inside the tubular elements; and wherein said pole pieces have central openings aligned with said tubular elements.

9. A motor as recited in claim 3 wherein said permanent magnets comprise first and second rings, said first ring having an inner surface comprising at least two north pole sections, and said second ring comprising an inner surface having at least two distinct south pole inner sections, each of said rings being aligned with a pole piece.

10. A motor as recited in claim 5 wherein said electric switching means comprises first and second transistors; and wherein said first winding is connected to both the first and second transistors, and the second winding is also connected to both the first and second transistors.

11. A motor as recited in claim 10 wherein said stator core structures when held together have the shape of a virtual bobbin; and wherein said windings are simple circumferential wrappings around said virtual bobbin.

12. A stator for a brushless transversal-flux permanent magnet motor comprising:

first and second pole pieces each comprising an elongated central portion having enlarged end terminations, of magnetic material;

a magnetic material cylindrical element extending between said pole pieces along an axis, and connected to the center of each, spacing said first and second pole pieces along said axis;

said pole pieces extending in parallel planes generally radially from said cylindrical element, and angularly offset about 90°;

first and second windings in the form of circumferential wrappings around and in contact with said cylindrical element and between said pole pieces; and non-magnetic material filling in the volume between said central portion and enlarged end terminations of each of said pole pieces, so that each of said pole pieces has a configuration of a disc.

13. A stator as recited in claim 12 wherein said cylindrical element is tubular having a through-extending central passageway; and wherein at least said second pole piece has a central through-extending opening aligned with said passageway.

14. A stator as recited in claim 12 wherein each of said enlarged end terminations has a surface thereof that is most radially remote from said cylindrical element, said surface being arcuate over the majority of the length thereof, but having a flat discontinuity.

15. A stator as recited in claim 14 wherein said cylindrical element is segmented, having a first segment integral with said first pole piece central portion, and a second segment integral with said second pole piece central portion.

16. A brushless transversal-flux permanent magnetic motor comprising:

a stator comprising first and second pole pieces each comprising an elongated central portion having enlarged end terminations, of magnetic material; a cylindrical element extending between said pole pieces along an axis, and connected to the center of each, spacing said first and second pole pieces along said axis, said pole pieces extending in parallel planes generally radially from said cylindrical element, and angularly offset about 90°; and first and second windings in the form of circumferential wrappings around said cylindrical element and between said pole pieces;

a rotor comprising first and second permanent magnet rings aligned with said stator first and second pole pieces, respectively, surrounding said stator and mounted for rotation with respect thereto; and electronic switching means for switching said windings so that they are alternately connected to a source of power.

17. A motor as recited in claim 16 wherein said pole pieces and permanent magnet rings are constructed so that said motor comprises a four pole motor.

18. A motor as recited in claim 16 wherein each of said enlarged end terminations of said stator has a surface thereof that is most radially remote from said cylindrical element, said surface being arcuate over the majority of the length thereof, but having a flat discontinuity.

19. A motor comprising:

a circuit board having motor drive circuitry thereon;

a stator mounted to said circuit board, in the form of a virtual bobbin;

first and second windings in the form of circumferential wrappings around said virtual bobbin, said windings being electrically connected to said motor drive circuitry;

wherein said stator in the form of a virtual bobbin comprising first and second pole pieces each comprises an elongated central portion having enlarged end terminations, of magnetic material, and a cylindrical element extending between said pole pieces connected to the center of each; and wherein each of said enlarged end terminations has a surface thereof that is most radially remote from said cylindrical element, said surface being arcuate over the majority of the length thereof, but having a flat discontinuity; and a rotor having magnetic rings aligned with said stator first and second pole pieces and mounted for rotation with respect to said stator.

20. A motor as recited in claim 2 wherein said powered iron of said stator core structure is doubly coated.

21. A stator as recited in claim 12 wherein said pole pieces are doubly coated powered iron.

22. A stator as recited in claim 12 wherein said cylindrical element is tubular having a through-extending passageway, and further comprising bearing means within said passageway.

* * * * *